(No Model.)

N. H. C. SLAUGHTER.
MILK AND BUTTER COOLER.

No. 421,199. Patented Feb. 11, 1890.

WITNESSES:
Albert P. Blackwood
W<sup>m</sup> Clabaugh

INVENTOR:
Nicholas H. C. Slaughter
by Connolly Bros.
Att'ys

UNITED STATES PATENT OFFICE.

NICHOLAS H. C. SLAUGHTER, OF HIGH POINT, NORTH CAROLINA, ASSIGNOR OF TWO-THIRDS TO EDWIN D. STEELE AND NEWELL BEESON.

MILK AND BUTTER COOLER.

SPECIFICATION forming part of Letters Patent No. 421,199, dated February 11, 1890.

Application filed July 26, 1889. Serial No. 318,717. (No model.)

*To all whom it may concern:*

Be it known that I, NICHOLAS H. C. SLAUGHTER, a citizen of the United States, residing at High Point, in the county of Guilford and State of North Carolina, have invented certain new and useful Improvements in Milk and Butter Coolers; and I do hereby declare the following to be a full, clear, and exact description of the invention, reference being had to the accompanying drawings, which form part of this specification.

My invention has relation to utensils for cooling milk, butter, &c., and has for its object the provision of a simple and inexpensive receptacle consisting of several independent chambers or vessels nesting together and adapted to be lowered into a well or spring for the purpose of cooling and keeping cool the contents of such vessels.

In carrying my invention into effect I provide two or more cylindrical metallic vessels adapted to nest together, one on top of the other, each vessel, except the bottom one, being provided with a downwardly-projecting flange which embraces the upper edge of the vessel next below it, the bottom vessel being provided with hinged interlocking wires which extend above the top of the uppermost vessel of the series and serve to keep all the vessels firmly nested together, so as to exclude air and water.

My invention consists in the novel construction of the nesting vessels and in the combination therewith of the peculiarly-constructed fastening devices, hereinafter described and specifically claimed.

Figure 1:
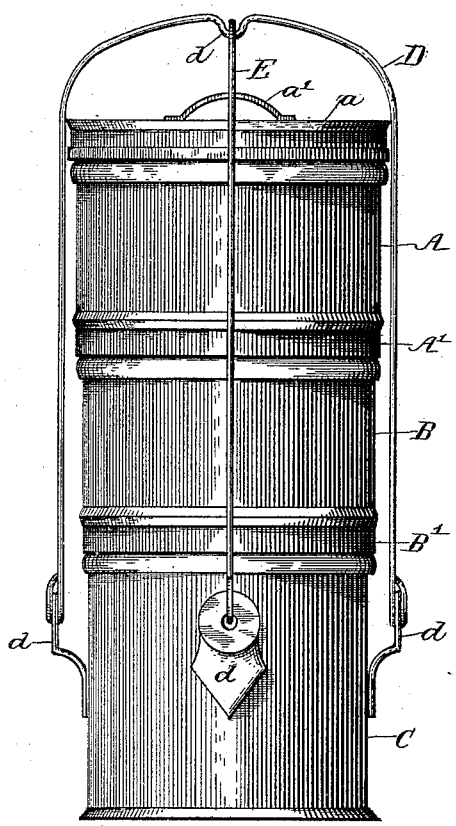
Figure 2:
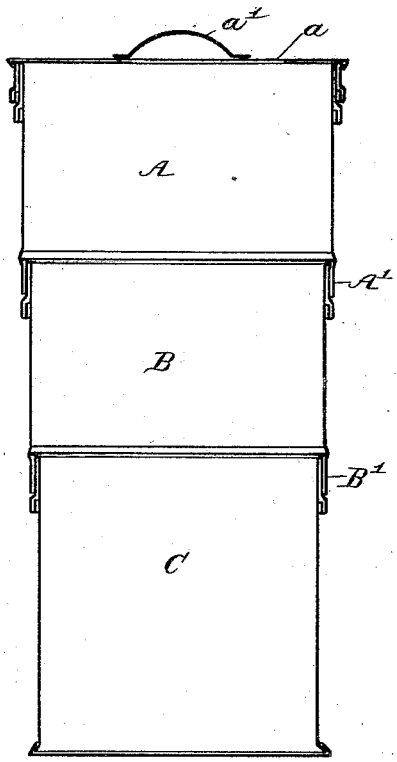

Referring to the accompanying drawings, Figure 1 is a side elevation, and Fig. 2 a vertical sectional view, of my improved cooling apparatus, and in said drawings A, B, and C designate separate and independent vessels set one upon the top of the other and adapted to contain milk, butter, or other liquid or food which it may be desirable to keep cool and from the air. The vessel A, which is the uppermost vessel of the series, is provided with a suitable lid $a$, having a handle $a'$. Around the lower edge of the vessel A is a downwardly-projecting flange $A'$, which, when the vessels are nested together, fits over and tightly embraces the upper edge of the vessel B below. The vessel B is provided at its bottom with a flange $B'$, similar to the flange $A'$ of vessel A, and the flange $B'$ fits over and embraces the upper edge of the bottom vessel C. The vessel C is provided with two wire loops or handles D E, which are hinged in lugs $d\ d$ upon the sides of the vessel, and are of such length that they can cross over the lid of the uppermost vessel A. The loops D E cross one another at right angles, and the loop D is formed with a notch or bend $d$, into which the loop E is sprung after the vessels have been nested together. The loops D and E impinge upon the edge of the lid of the vessel A and serve to keep the lid pressed down and to maintain all the vessels in their proper relative positions.

Operation: The loop E being sprung out of the notch $d$ in loop D, both loops are swung around until they clear the top of the lid of the vessel A. The several vessels are then taken apart and filled and then nested together again. The loops D E are brought back to their original position. A rope or wire is then attached to the loops or the handle A, and by means of such rope or wire the vessel is lowered into a spring, well, or other reservoir containing cold water, which speedily cools and maintains at a proper temperature the contents of the vessels. The vessels, being tightly fitted together, exclude the water, and the loops D and E serve to keep them in their proper positions.

While I have shown and described but three vessels nested together, the number of vessels may be increased to any extent by making them of less height or by increasing the length of the loops D E.

Having described my invention, I claim—

In a device for cooling food, the combination, with the vessels A B C, nested together and arranged one above the other, as shown, of the flanged lid $a$, fitted to the top of the vessel A, and the wire loops D E, hinged to the sides of the bottom vessel C, the loop D being formed with the notch $d$, into which the loop E is sprung, said loops impinging upon the flanged lid, substantially as and for the purpose set forth.

In testimony that I claim the foregoing I have hereunto set my hand this 25th day of July, 1889.

NICHOLAS H. C. SLAUGHTER.

Witnesses:
J. H. MILLIS,
W. T. KIRKMAN.